United States Patent
Wu

(10) Patent No.: US 11,997,433 B2
(45) Date of Patent: May 28, 2024

(54) PROJECTION DEVICE AND PROJECTING METHOD FOR SELECTING GAMMA CORRECTION CURVE

(71) Applicant: Coretronic Corporation, Hsin-Chu (TW)

(72) Inventor: Po-Yen Wu, Hsin-chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 18/070,415

(22) Filed: Nov. 28, 2022

(65) Prior Publication Data

US 2023/0179750 A1 Jun. 8, 2023

(30) Foreign Application Priority Data

Dec. 6, 2021 (CN) .......................... 202111475627.9

(51) Int. Cl.
*H04N 9/31* (2006.01)
*G09G 3/00* (2006.01)
*G09G 3/20* (2006.01)

(52) U.S. Cl.
CPC ........... *H04N 9/3182* (2013.01); *G09G 3/002* (2013.01); *G09G 3/2011* (2013.01); *G09G 2320/0276* (2013.01); *G09G 2360/16* (2013.01)

(58) Field of Classification Search
CPC ...... H04N 9/3182; H04N 5/20; H04N 1/4078; G09G 3/002; G09G 3/2011; G09G 2320/0276; G09G 2360/16; G09G 3/3696; G09G 3/3233; G09G 3/20; G09G 3/342; G09G 3/3225
See application file for complete search history.

(56) References Cited

U.S. PATENT DOCUMENTS

| 7,061,504 | B1* | 6/2006 | Glen | .................... | G09G 3/2011 |
|---|---|---|---|---|---|
| | | | | | 345/600 |
| 11,095,861 | B2 | 8/2021 | Wang et al. | | |
| 2005/0104837 | A1* | 5/2005 | Baik | ..................... | G09G 3/342 |
| | | | | | 345/99 |

(Continued)

FOREIGN PATENT DOCUMENTS

CN 106534708 3/2017

*Primary Examiner* — Richard J Hong
(74) *Attorney, Agent, or Firm* — JCIPRNET

(57) ABSTRACT

A projection device and a projecting method are provided. The projection device includes a controller, a light engine, and a storage device. The storage device stores gamma correction curves and a predetermined amount. The controller receives display information of an image. The display information includes pixel information. The controller is configured to: set gray level regions and determine which gray level region does each pixel information fall into according to a gray level of the pixel information; calculate a pixel amount of the pixel information fallen into each gray level region; and when one of the pixel amount exceeds the predetermined amount, select a selected gamma correction curve from the gamma correction curves and adjust the display information according to the selected gamma correction curve to generate adjusted display information. The light engine is electrically coupled to the controller, receives the adjusted display information, and projects an adjusted image accordingly.

10 Claims, 6 Drawing Sheets

(56) References Cited

U.S. PATENT DOCUMENTS

| | | | |
|---|---|---|---|
| 2008/0291505 A1* | 11/2008 | Shih | H04N 1/4078 |
| | | | 358/461 |
| 2011/0043704 A1* | 2/2011 | Shoji | H04N 9/3182 |
| | | | 348/E5.074 |
| 2011/0069096 A1* | 3/2011 | Li | G09G 3/3225 |
| | | | 345/690 |
| 2012/0032998 A1* | 2/2012 | An | G09G 3/3696 |
| | | | 345/213 |
| 2013/0033517 A1* | 2/2013 | Choi | H04N 5/20 |
| | | | 345/589 |
| 2014/0146090 A1* | 5/2014 | Oh | G09G 3/20 |
| | | | 345/690 |
| 2015/0228224 A1* | 8/2015 | Park | G09G 3/3233 |
| | | | 345/691 |
| 2019/0037188 A1* | 1/2019 | Hatakenaka | G09G 3/3233 |

* cited by examiner

PROJECTION DEVICE AND PROJECTING METHOD FOR SELECTING GAMMA CORRECTION CURVE

CROSS-REFERENCE TO RELATED APPLICATION

This application claims the priority benefit of China application serial no. 202111475627.9, filed on Dec. 6, 2021. The entirety of the above-mentioned patent application is hereby incorporated by reference herein and made a part of this specification.

BACKGROUND

Technical Field

The disclosure relates to a display device and method, and particularly relates to a projection device and a projecting method suitable for the projection device.

Description of Related Art

In the existing display technology, in order to display high-contrast image content, a circuit or a chip that processes an image is often used to store meta data into data with a specific image format, so that the image has a high dynamic contrast mode (for example, a high dynamic range (HDR), a hybrid log-gamma (HLG), and other modes). On the other hand, the high dynamic contrast correction effect can only be supported when the display device has the function of reading the meta data. In addition, the increased use of hardware chips or circuits, such as a field programmable gate array (FPGA), is expensive and cannot be used in conventional projection devices.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection device and a projecting method, which can improve the display effect of an image.

A projection device of the disclosure includes a controller, a light engine, and a storage device. The storage device is configured to store multiple gamma correction curves and a predetermined amount. The controller is configured to receive display information of an image. The display information includes multiple pixel information. The controller is configured to perform the following. Multiple gray level regions are set and which of the gray level regions does each of the pixel information fall into is determined according to a gray level of the pixel information. Multiple pixel amount of the pixel information fallen into each gray level region are calculated. When one of the pixel amount exceeds the predetermined amount, a selected gamma correction curve is selected from the gamma correction curves, and the display information is adjusted according to the selected gamma correction curve to generate adjusted display information. The light engine is electrically coupled to the controller and is configured to receive the adjusted display information and project an adjusted image accordingly.

In an embodiment, the controller is configured to determine the gray level region corresponding to one of the pixel amount exceeding the predetermined amount as a selected gray level region and correct the pixel information of the selected gray level region according to the selected gamma correction curve.

In an embodiment, the controller is configured to correct the pixel information of the selected gray level region according to the selected gamma correction curve to increase a gray level range of the pixel information of the selected gray level region.

In an embodiment, when a first gray level region less than a first gray level among the gray level regions is determined as the selected gray level region, in a range less than the first gray level, the selected gamma correction curve is an increasing curve with decreasing slope.

In an embodiment, when a second gray level region greater than a second gray level among the gray level regions is determined as the selected gray level region, in a range greater than the second gray level, the selected gamma correction curve is an increasing curve with increasing slope.

A projecting method of the disclosure includes the following steps. Display information of an image is received by a controller. The display information includes multiple pixel information. Multiple gray level regions are set and which of the gray level regions does each of the pixel information fall into is determined according to a gray level of the pixel information by the controller. Multiple pixel amount of the pixel information fallen into each gray level region are calculated by the controller. When one of the pixel amount exceeds a predetermined amount, a selected gamma correction curve is selected from multiple gamma correction curves and the display information is adjusted according to the selected gamma correction curve to generate adjusted display information by the controller. The gamma correction curves and the predetermined amount are stored in a storage device. The adjusted display information is received and an adjusted image is projected accordingly by an light engine.

Based on the above, the projection device and the projecting method can select the corresponding gamma correction curve according to a statistical amount of the gray level regions, thereby performing gamma correction and projecting the adjusted image accordingly.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
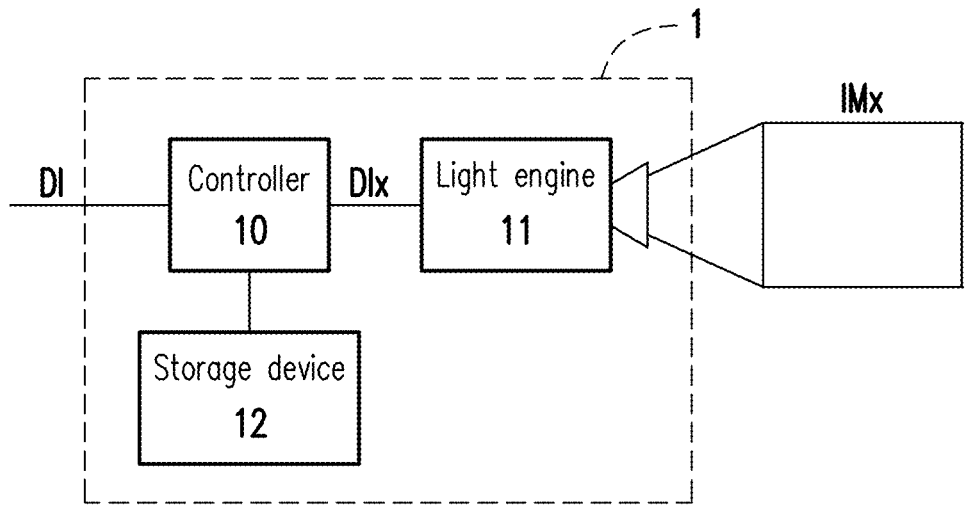
FIG. 1 is a block schematic diagram of a projection device according to an embodiment of the disclosure.

FIG. 1 is a block schematic diagram of a projection device 1 according to an embodiment of the disclosure. The projection device 1 may be configured to receive display information DI of an image from an external information source and perform gamma correction on the display information DI to adjust the image, thereby projecting an adjusted image. More specifically, the projection device 1 may determine a gray level distribution in the image according to the display information DI and select a corresponding gamma correction curve for correction according to the determined gray level distribution to project an adjusted image IMx. The external information source is, for example, a laptop computer, a smart phone, etc.

The projection device 1 includes a controller 10, a light engine 11, and a storage device 12. The controller 10 may receive the display information DI of the image. The display information DI contains multiple pixel information respectively corresponding to multiple pixels of the image. Gray levels corresponding to the pixels contained in each pixel information may be configured to project the image. The storage device 12 is electrically coupled to the controller 10. The storage device 12 is configured to store multiple gamma correction curves and a predetermined pixel amount. Further, the controller 10 may calculate the gray levels in the pixel information to determine the gray level distribution of the overall image corresponding to the display information DI, thereby performing the gamma correction on the display information according to the determined gray level distribution. Finally, the controller 10 may control the light engine 11 to project the adjusted image according to adjusted display information DIx.

In some embodiments, the controller 10 may be, for example, a central processing unit (CPU), or other programmable general-purpose or specific-purpose micro control unit (MCU), microprocessor, digital signal processor (DSP), programmable controller, application specific integrated circuit (ASIC), graphics processing unit (GPU), arithmetic logic unit (ALU), complex programmable logic device (CPLD), field programmable gate array (FPGA), any other types of integrated circuit, state machine, processor based on advanced reduced instruction set computer machine (ARM), other similar elements, or a combination of the above elements. Alternatively, the controller 10 may be a hardware circuit designed through hardware description language (HDL) or any other digital circuit design means well known to persons skilled in the art and implemented through the FPGA, the CPLD, or the ASIC.

In some embodiments, the controller 10 may also be implemented through, for example, a scalar, such as a DDP scalar by Texas Instruments (TI). In this way, the projection device 1 may count the pixel amount of each gray level region through a built-in function of the scalar, so that the contrast of a display image can be simultaneously improved without additional hardware.

In some embodiments, the light engine 11 is, for example, a digital light processing (DLP) projector, which contains a light source, a digital micromirror device (DMD), and other optical elements. Different hardware variations all belong to the scope of the disclosure. For example, the light engine 11 uses a liquid crystal panel as a projector of a light valve, as long as the same may be configured to receive the display information to project the image.

In some embodiments, the storage device 12 is, for example, a removable random access memory (RAM), a read-only memory (ROM), a flash memory, similar elements, or a combination of the above elements.

Figure 2:
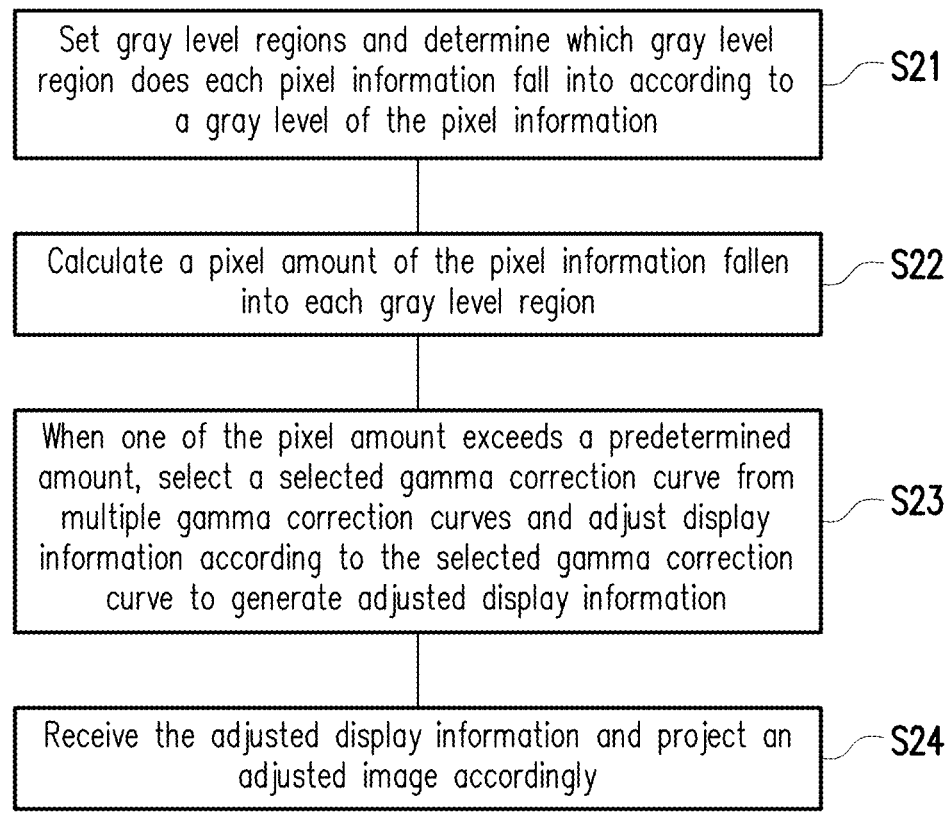
FIG. 2 is a flowchart of a projecting method according to an embodiment of the disclosure.

FIG. 2 is a flowchart of a projecting method according to an embodiment of the disclosure. The projecting method shown in FIG. 2 may be executed through the projection device 1 shown in FIG. 1. Therefore, please refer to FIG. 1 and FIG. 2 together to understand the following description of the projecting method.

In Step S21, when the display information DI is transmitted to the controller 10, the controller 10 may first set multiple gray level regions and determine which of the gray level regions does each of the pixel information fall into. For example, the controller 10 may set a gray level range from 0 to 255 to several gray level regions with equal range. Then, the controller may determine the range of which of the gray level regions does the gray level of each of the pixel information fall into.

In Step S22, the controller 10 may calculate the pixel amount of the pixel information fallen into each gray level region. Specifically, the controller 10 may count each gray level region and calculate a cumulative amount (that is, the pixel amount) of the pixel information fallen into each gray level region, thereby determining whether an overall image to be projected by the projection device 1 belongs to a low gray level, a medium gray level, a high gray level distribution, or has other gray level distribution characteristics in the subsequent step.

In Step S23, when one of the pixel amount exceeds a predetermined amount, the selected gamma correction curve is selected from the gamma correction curves and the display information is adjusted according to the selected gamma correction curve to generate the adjusted display information DIx. In detail, each gray level region may correspond to the same or different predetermined amount as a threshold for determination. The controller 10 may compare the pixel amount accumulated in each gray level region with the corresponding predetermined amount. When the controller 10 determines that one of the pixel amount exceeds the predetermined amount, the controller 10 may determine the gray level region exceeding the predetermined amount as the selected gray level region and select the gamma correction curve corresponding to the selected gray level region from the gamma correction curves according to the selected gray level region as the selected gamma correction curve.

In this way, the controller 10 may adjust the display information DI according to the selected gamma correction curve to generate the adjusted display information DIx, so that pixels fallen into the selected gray level region have better contrast.

In Step S24, the light engine 11 may receive the adjusted display information DIx and project the adjusted image IMx accordingly.

Therefore, the projection device and the projecting method may select the corresponding gamma correction curve for correction according to the pixel amount counted for each gray level region. Even if the display information DI does not support a 4K high-contrast data format, correction can still be performed to improve the contrast and resolution of the display image. On the other hand, since the gamma correction only needs to count the pixel amount of each gray level region, the gamma correction can be completed through relatively simple hardware and steps, so that correction can be performed in real time under low hardware requirements. Therefore, the hardware cost and user experience of the projection device and the projecting method are effectively improved.

Figure 3:
FIG. 3 is a schematic diagram of an image corresponding to display information received by a projection device according to an embodiment of the disclosure.

FIG. 3 is a schematic diagram of an image IM corresponding to the display information DI received by the projection device 1 according to an embodiment of the disclosure. Hereinafter, FIG. 3 will be used as an exemplary embodiment to further illustrate the operation details of the projection device 1 when performing the projecting method, so please refer to FIG. 1 to FIG. 3 together to understand the description in the following paragraphs.

First, in Step S21, the controller 10 may set the gray level range from 0 to 255 to eight gray level regions, and each gray level region has the same gray level range. Therefore, the gray level range from 0 to 255 may be, for example, divided into eight gray level ranges, such as 0 to 31, 32 to 63, 64 to 95, 96 to 127, 128 to 159, 160 to 191, 192 to 223, and 224 to 255. Then, the controller 10 may determine which gray level range does the gray level of each pixel information falls into in the display information DI according to the received display information DI. The number of gray level regions set from the gray level range from 0 to 255 by the controller 10 may be arranged by the designer without limitation. In another embodiment, the designer may enable the controller 10 to set the gray level range from 0 to 255 to 16 gray level regions.

In Step S22, the controller 10 may count each gray level region to calculate the cumulative amount (that is, the pixel amount) of the pixel information fallen into each gray level region.

Figure 4:
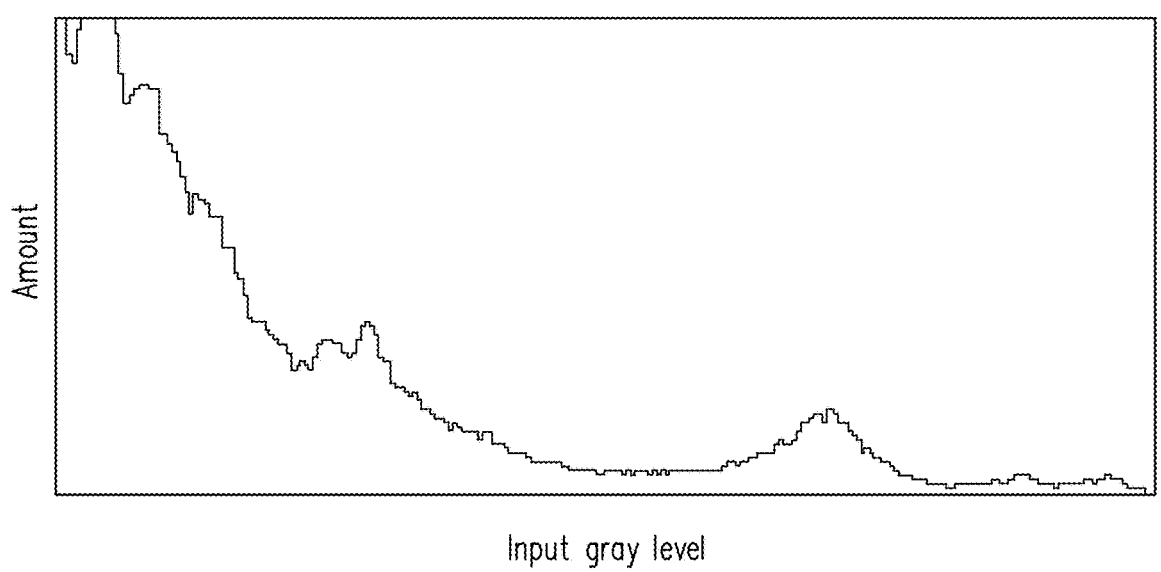
FIG. 4 is a schematic diagram of a gray level distribution corresponding to an image according to an embodiment of the disclosure.

FIG. 4 is a schematic diagram of a gray level distribution corresponding to an image IM according to an embodiment of the disclosure. As shown in FIG. 4, the image IM of FIG. 3 shows a higher proportion of pixels with low gray levels. Therefore, the overall image shown in FIG. 3 is darker. Therefore, some details in darker gray level areas of the image cannot be clearly presented. For example, a circle C1 in FIG. 3 is a dark gray level, and gray levels thereof are relatively close and have poor contrast, so the user cannot easily recognize the details in the circle C1.

Furthermore, after the controller 10 counts gray level distribution values, the controller may calculate the pixel amount accumulated in each gray level range. In the embodiment, the controller 10 may obtain that the pixel amount accumulated in the gray level range from 0 to 31 accounts for 56% of the total number of pixels of the image IM; the pixel amount accumulated in the gray level range from 32 to 63 accounts for 22% of the total number of pixels of the image IM; the pixel amount accumulated in the gray level range from 64 to 95 accounts for 10% of the total number of pixels of the image IM; the pixel amount accumulated in the gray level range from 96 to 127 accounts for 5% of the total number of pixels of the image IM; the pixel amount accumulated in the gray level range from 128 to 159 accounts for 2% of the total number of pixels of the image IM; the pixel amount accumulated in the gray level range from 160 to 191 accounts for 2% of the total number of pixels of the image IM; the pixel amount accumulated in the gray level range from 192 to 223 accounts for 2% of the total number of pixels of the image IM; and the pixel amount accumulated in the gray level range from 224 to 255 accounts for 1% of the total number of pixels of the image IM.

In Step S23, the controller 10 may compare the pixel amount in each gray level range with the corresponding predetermined amount (a predetermined pixel amount). In the embodiment, the predetermined amount may be, for example, as shown in Table 1 below. The pixel amount of a first gray level range (that is, the gray level range from 0 to 31) may correspond to the predetermined amount 50%; the pixel amount accumulated in fourth to sixth gray level ranges (that is, the gray level range from 96 to 191) may correspond to the predetermined amount 30%; and the pixel amount of an eighth gray level range (that is, the gray level range from 224 to 255) may correspond to the predetermined amount 40%.

TABLE 1

| Gray level | 0 to 31 | 96 to 191 | 224 to 255 |
| --- | --- | --- | --- |
| Amount proportion | 50% | 30% | 40% |

Therefore, the controller 10 may compare the pixel amount accumulated in each gray level range counted or calculated in Step S22 with the corresponding predetermined amount. In the embodiment, the controller 10 may determine that the pixel amount of the first gray level range (that is, the gray level range from 0 to 31) is 56%, which is greater than the corresponding predetermined amount 50%. The pixel amount accumulated in the fourth to sixth gray level ranges (that is, the gray level range from 96 to 191) is 9% and the pixel amount of the eighth gray level range (that is, the gray level range from 224 to 255) is 1%, which are respectively less than the corresponding predetermined amount 30% and 40%. In this way, the controller 10 may select the selected gamma correction curve according to a comparison result that the pixel amount of the first gray level range is greater than the predetermined amount.

Figure 5A:
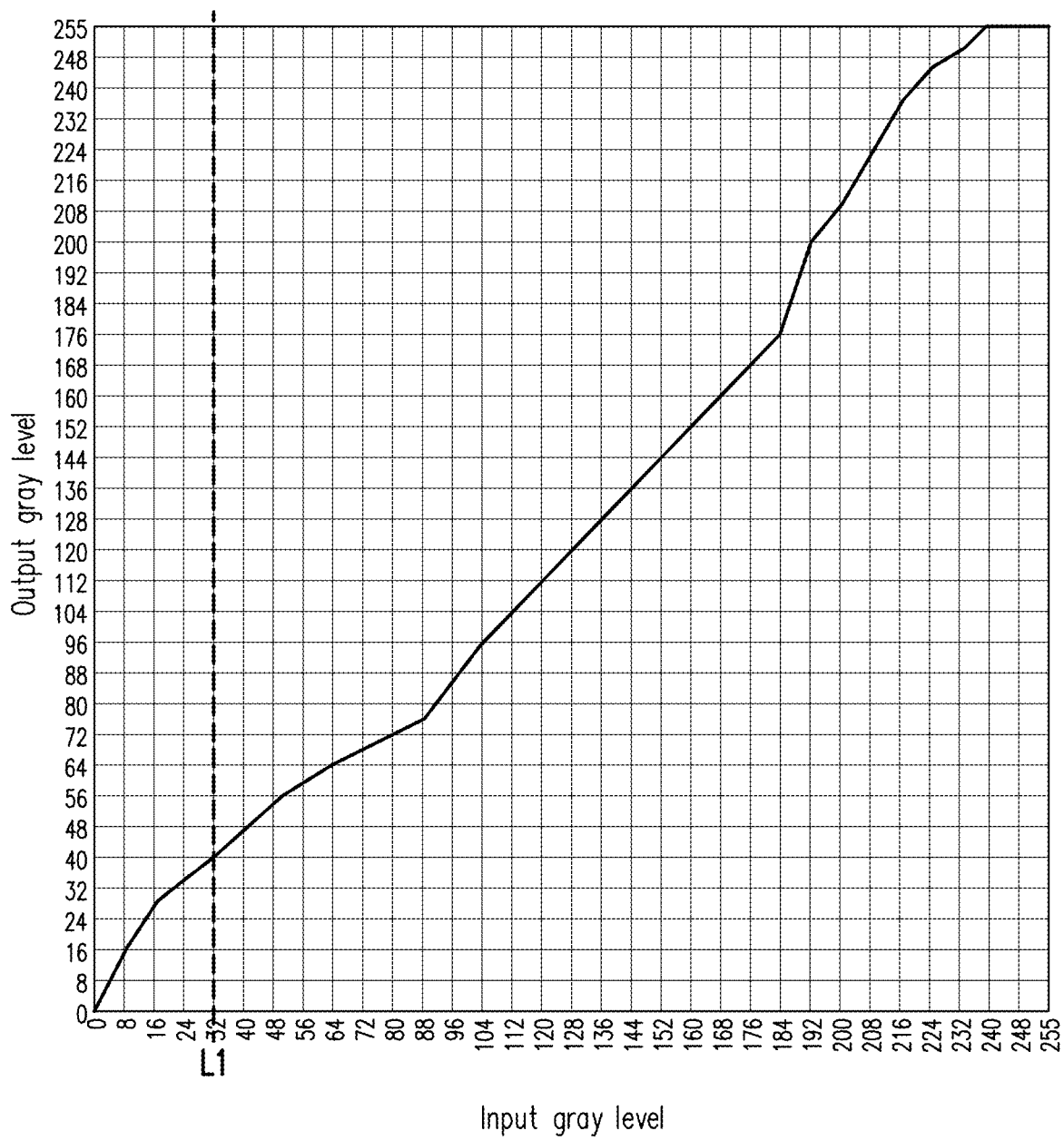
FIG. 5A to FIG. 5C are relationship diagrams of multiple gamma correction curves according to an embodiment of the disclosure.
Figure 5B:
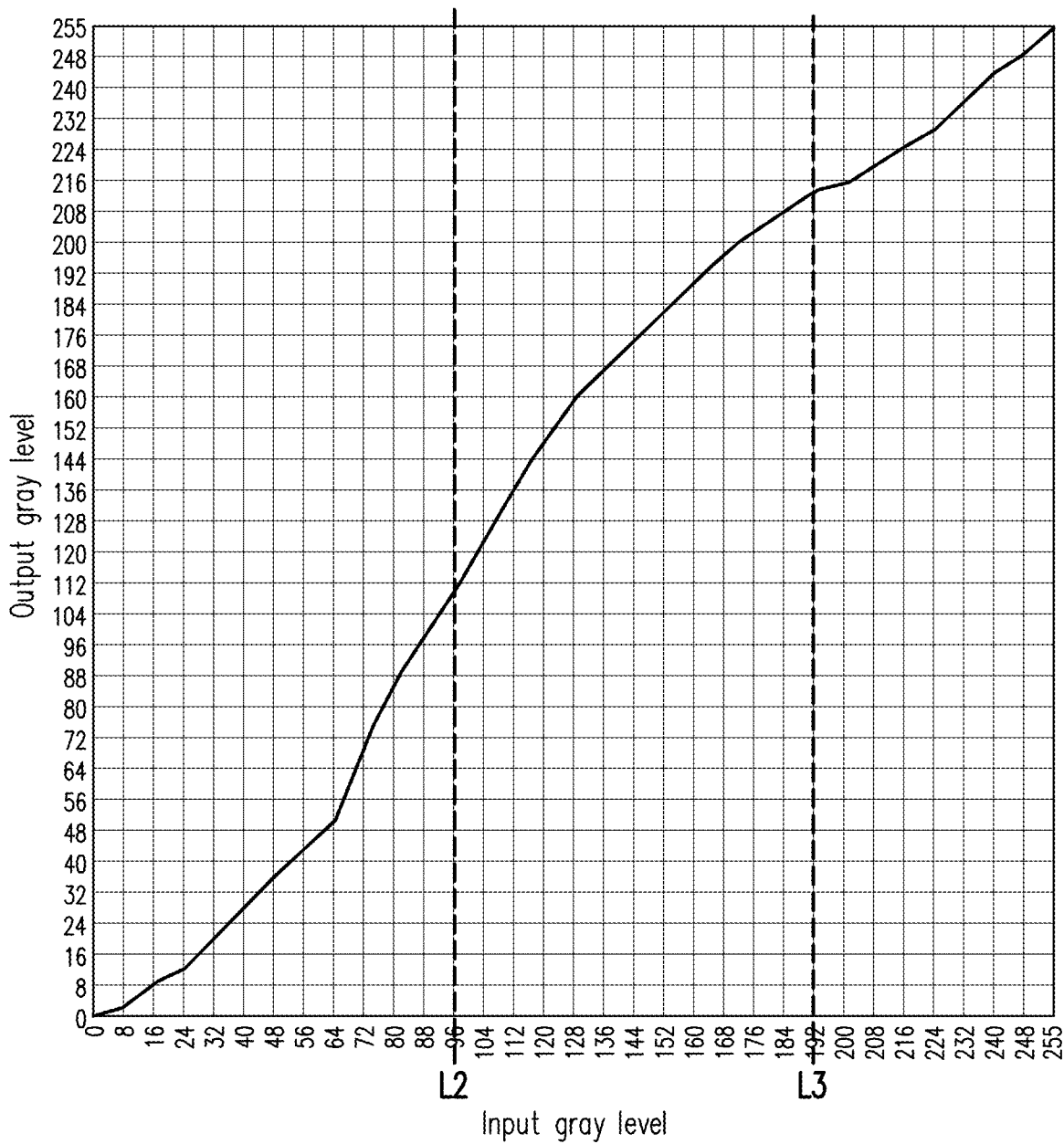
Figure 5C:
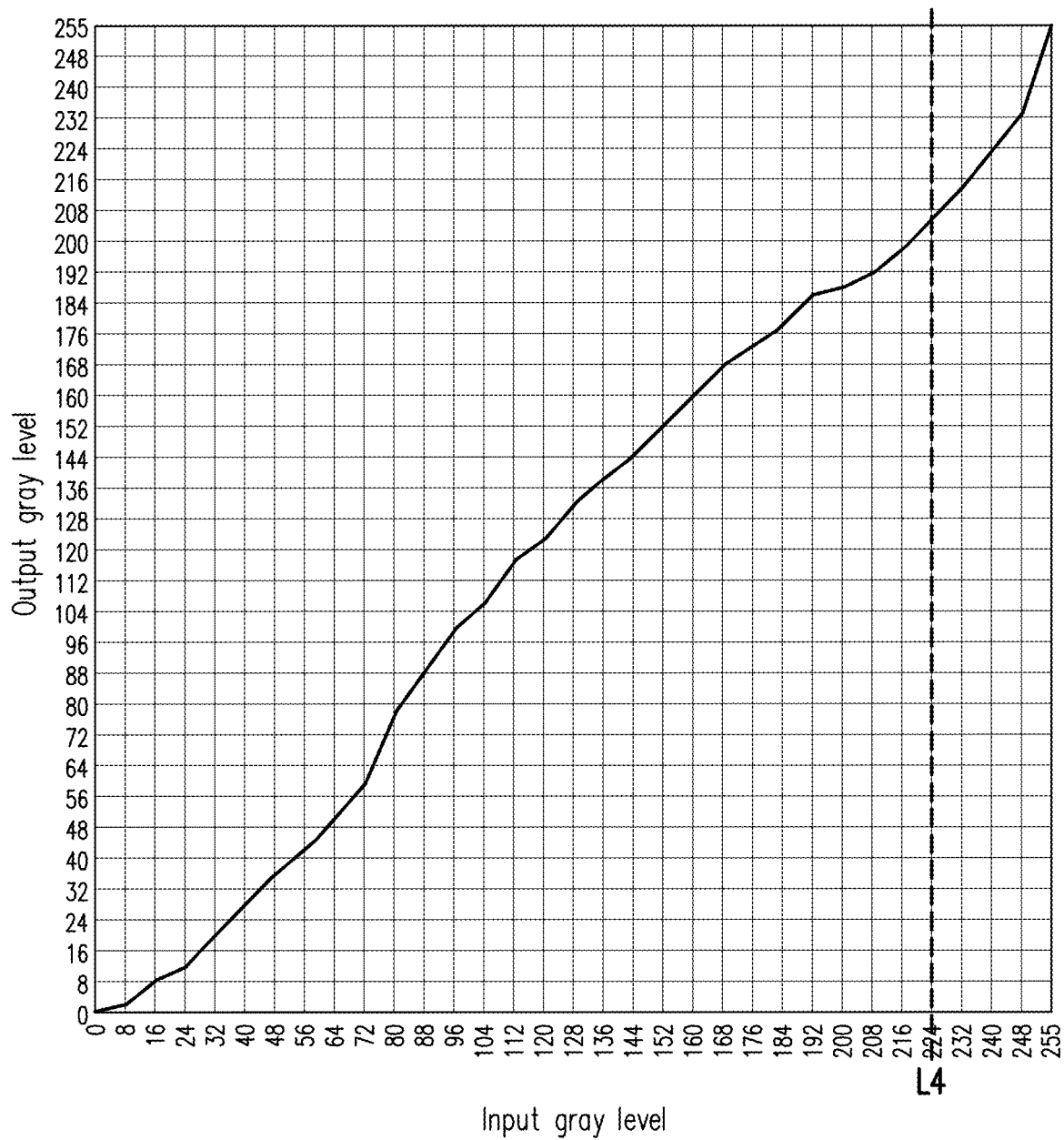

FIG. 5A to FIG. 5C are relationship diagrams of multiple gamma correction curves according to an embodiment of the disclosure. The storage device 12 is configured to store the gamma correction curves and the predetermined amount. The controller 10 may read and execute the gamma correction curves and the predetermined amount (the predetermined pixel amount). FIG. 5A illustrates a first gamma correction curve corresponding to when the pixel amount of the first gray level range is greater than the predetermined amount; FIG. 5B illustrates a second gamma correction curve corresponding to when the pixel amount of the fourth to sixth gray level ranges are greater than the predetermined amount; and FIG. 5C illustrates a third gamma correction curve corresponding to when the pixel amount of the eighth gray level range is greater than the predetermined amount.

In FIG. 5A to FIG. 5C, the horizontal axis is an input gray level and the vertical axis is an output gray level. In this way, when the slope of the gamma correction curve is one, it represents that the output gray level range is equal to the input gray level range, and the contrast of the gray level range is maintained. When the slope of the gamma correction curve is greater than one, it represents that the output gray level range is greater than the input gray level range, and the contrast of the gray level range is increased. When the slope of the gamma correction curve is less than one, it represents that the output gray level range is less than the input gray level range, and the contrast of the gray level range is reduced.

In some embodiments, the first, second, and third gamma correction curves may further contain other linear or non-linear computations and conversion relationships to improve the resolution of the display image. The first, second, and third gamma correction curves may respectively perform the gamma correction on the image IM in the low gray level range, the middle gray level range, and the high gray level range. Therefore, when a relatively large low gray level area is displayed in the image IM, the first gamma correction curve may be used to increase the output gray level range of the low gray level range. Similarly, the second and third gamma correction curves may be used to respectively increase the output gray level ranges of the middle gray level and high gray level ranges.

In FIG. 5A, a line L1 indicates the position where the input gray level is 32, that is, the left side of the line L1 is the first gray level range. Therefore, in the first gamma correction curve, the output gray level range corresponding to the first gray level range is approximately 0 to 40 and the average slope thereof is greater than one. Compared with the second and third gamma correction curves whose output gray level range corresponding to the first gray level range is approximately 0 to 20 and average slope thereof is less than one, a first gamma correction curve now has a larger output gray level range in the first gray level region. In this way, after the first gamma correction curve is adjusted, the mean of the gray levels of the overall pixels will be adjusted higher, and the gray level region will also be adjusted brighter. In addition, in the gray level region, the difference between the gray levels can be increased, which increases the contrast, thereby improving the degree of detail resolution in the gray level range. On the other hand, in the first gray level range, the slope of the first gamma correction curve is positive, and the slope gradually decreases. In other words, the first gamma correction curve is an increasing function with downward notch in the first gray level range.

In addition, in FIG. 5B, lines L2 and L3 respectively indicate the positions where the input gray levels are 96 and 192, that is, the ranges in the lines L2 to L3 are the fourth to sixth gray level ranges. Compared with FIG. 5A and FIG. 5C, the second gamma correction curve shown in FIG. 5B has a larger output gray level range in the fourth to sixth gray level ranges, so that the contrast of pixels fallen into the gray level ranges is increased.

In FIG. 5C, a line L4 indicates the position where the input gray level is 224, that is, the right side of the line L4 is the eighth gray level range. Compared with FIG. 5A and FIG. 5B, the third gamma correction curve shown in FIG. 5C has a larger output gray level range in the eighth gray level range. As a result, after the third gamma correction curve is adjusted, the mean of the gray levels of the overall pixels will be reduced, and the gray level region will also be darkened. On the other hand, in the eighth gray level range, the slope of the third gamma correction curve is positive, and the slope is gradually increasing. In other words, the third gamma correction curve is an increasing function with upward notch in the eighth gray level range.

Therefore, according to the above, the controller 10 may select the first gamma correction curve as the selected gamma correction curve according to the comparison result to perform the gamma correction on the display information DI of the image IM to generate the adjusted display information DIx.

Finally, in Step S24, the light engine 11 may receive the adjusted display information DIx and project the adjusted image IMx accordingly.

Figure 6:
FIG. 6 is a schematic diagram of an adjusted image projected by a projection device after receiving display information according to an embodiment of the disclosure.

FIG. 6 is a schematic diagram of the adjusted image IMx projected by the projection device 1 after receiving the display information DI according to an embodiment of the disclosure. Therefore, please refer to FIG. 3 and FIG. 6 together to understand the following description of the adjusted image IMx.

In FIG. 6, after the first gamma correction curve is adjusted, the overall gray level at a circle C2 is brightened, and the overall contrast is also increased. Therefore, compared with the circle C1 in FIG. 3, the details in the circle C2 in FIG. 6 can be easily observed, thereby improving the overall display effect of the projection device 1.

In summary, the projection device and the projecting method of the disclosure can select the corresponding gamma correction curve for correction according to the pixel amount counted in each gray level region. Since the gamma correction only needs to count the pixel amount in each gray level region, the gamma correction can be completed through relatively simple hardware and steps, so that correction can be performed in real time under low hardware requirements. Therefore, the hardware cost and user experience of the projection device and the projecting method are effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection device, comprising:
a storage device, configured to store a plurality of gamma correction curves and a predetermined amount;
a controller, electrically coupled to the storage device and configured to receive display information of an image, wherein the display information comprises a plurality of pixel information, and the controller is configured to:
set a plurality of gray level regions and determine which of the gray level regions does each of the pixel information fall into according to a gray level of the pixel information;
calculate a plurality of pixel amount of the pixel information fallen into each of the gray level regions; and
when one of the pixel amount exceeds the predetermined amount, select one corresponding selected gamma correction curve from the gamma correction curves and adjust the display information according to the one corresponding selected gamma correction curve to generate adjusted display information; and
a light engine, electrically coupled to the controller and configured to receive the adjusted display information and project an adjusted image accordingly.

2. The projection device according to claim 1, wherein the controller is configured to:
determine the gray level region corresponding to one of the pixel amount exceeding the predetermined amount as a selected gray level region and correct the pixel information of the selected gray level region according to the one corresponding selected gamma correction curve.

3. The projection device according to claim 2, wherein the controller is configured to:
correct the pixel information of the selected gray level region according to the one corresponding selected gamma correction curve to increase a gray level range of the pixel information of the selected gray level region.

4. The projection device according to claim 2, wherein:
when a first gray level region less than a first gray level among the gray level regions is determined as the selected gray level region, in a range less than the first gray level, the one corresponding selected gamma correction curve is an increasing curve with decreasing slope.

5. The projection device according to claim 2, wherein:
when a second gray level region greater than a second gray level among the gray level regions is determined as the selected gray level region, in a range greater than the second gray level, the one corresponding selected gamma correction curve is an increasing curve with increasing slope.

6. A projecting method, comprising:
receiving display information of an image by a controller, wherein the display information comprises a plurality of pixel information;
setting a plurality of gray level regions and determining which of the gray level regions does each of the pixel information fall into according to a gray level of the pixel information by the controller;
calculating a plurality of pixel amount of the pixel information fallen into each of the gray level regions by the controller;
when one of the pixel amount exceeds a predetermined amount, selecting one corresponding selected gamma correction curve from a plurality of gamma correction curves and adjusting the display information according to the one corresponding selected gamma correction curve to generate adjusted display information by the controller, wherein the gamma correction curves and the predetermined amount are stored in a storage device; and
receiving the adjusted display information and projecting an adjusted image accordingly by a light engine.

7. The projecting method according to claim 6, comprising:
determining the gray level region corresponding to one of the pixel amount exceeding the predetermined amount as a selected gray level region and correcting the pixel information of the selected gray level region according to the one corresponding selected gamma correction curve by the controller.

8. The projecting method according to claim 7, comprising:
correcting the pixel information of the selected gray level region according to the one corresponding selected gamma correction curve to increase a gray level range of the pixel information of the selected gray level region by the controller.

9. The projecting method according to claim 7, wherein:
when a first gray level region less than a first gray level among the gray level regions is determined as the selected gray level region, in a range less than the first gray level, the one corresponding selected gamma correction curve is an increasing curve with decreasing slope.

10. The projecting method according to claim 7, wherein:
when a second gray level region greater than a second gray level among the gray level regions is determined as the selected gray level region, in a range greater than the second gray level, the one corresponding selected gamma correction curve is an increasing curve with increasing slope.

* * * * *